United States Patent
Pasek et al.

(10) Patent No.: US 7,229,277 B2
(45) Date of Patent: Jun. 12, 2007

(54) MOLD COVER LIFT SYSTEM FOR A PATTY-FORMING APPARATUS

(75) Inventors: James E. Pasek, Tinley Park, IL (US); Salvatore Lamartino, Orland Park, IL (US)

(73) Assignee: Formax, Inc., Mokena, IL (US)

( * ) Notice: Subject to any disclaimer, the term of this patent is extended or adjusted under 35 U.S.C. 154(b) by 370 days.

(21) Appl. No.: 10/942,737

(22) Filed: Sep. 16, 2004

(65) Prior Publication Data

US 2005/0074513 A1    Apr. 7, 2005

Related U.S. Application Data

(60) Provisional application No. 60/515,585, filed on Oct. 29, 2003, provisional application No. 60/503,354, filed on Sep. 16, 2003.

(51) Int. Cl.
B29C 45/42 (2006.01)

(52) U.S. Cl. .................. 425/556; 425/572

(58) Field of Classification Search ............. 425/572; 424/556
See application file for complete search history.

(56) References Cited

U.S. PATENT DOCUMENTS

| | | | |
|---|---|---|---|
| 3,952,478 A | 4/1976 | Richards et al. | |
| 4,054,967 A | 10/1977 | Sandberg et al. | |
| 4,118,831 A | * 10/1978 | Holly et al. | 425/562 |
| RE30,096 E | 9/1979 | Richards | |
| 4,182,003 A | 1/1980 | Lamartino et al. | |
| 4,187,581 A | * 2/1980 | Wagner | 425/556 |
| 4,356,595 A | 11/1982 | Sandberg et al. | |
| 4,372,008 A | 2/1983 | Sandberg | |
| 4,697,308 A | * 10/1987 | Sandberg | 425/556 |
| 4,821,376 A | 4/1989 | Sandberg | |
| 4,996,743 A | 3/1991 | Janssen | |
| 5,980,228 A | * 11/1999 | Soper | 425/145 |
| 7,125,245 B2 | * 10/2006 | Hansen et al. | 425/556 |

OTHER PUBLICATIONS

Bucket Lift, F-26C Manual, Oct. 31, 1997, 22 pages, Formax, Inc.
Bucket Lift, F-26C Manual, Sep. 15, 1993, 36 pages, Formax, Inc.

* cited by examiner

*Primary Examiner*—Tim Heitbrink
(74) *Attorney, Agent, or Firm*—The Law Office of Randall T. Erickson

(57) ABSTRACT

A reciprocating mold plate food patty-forming machine is provided that includes a mold plate that reciprocates between a cavity fill position and a patty discharge position. The mold plate is movable beneath a mold cover. A mold cover lifting apparatus is provided as part of the machine and comprises a primary threaded drive that is configured to support and elevate the mold cover and which elevates or lowers upon input of rotary power to raise or lower the mold cover. A motor is operatively connected to the primary threaded drive to input rotary power to the primary threaded drive. A secondary threaded element follows the primary threaded drive and is configured to support the mold cover if the primary threaded drive fails.

5 Claims, 14 Drawing Sheets

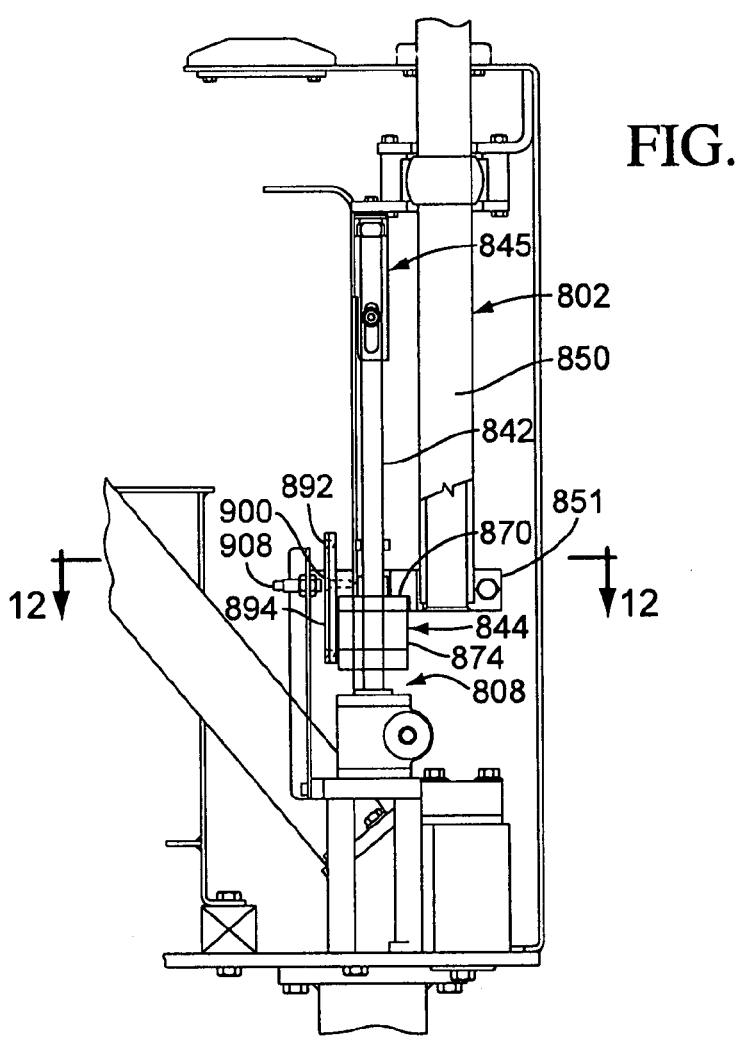
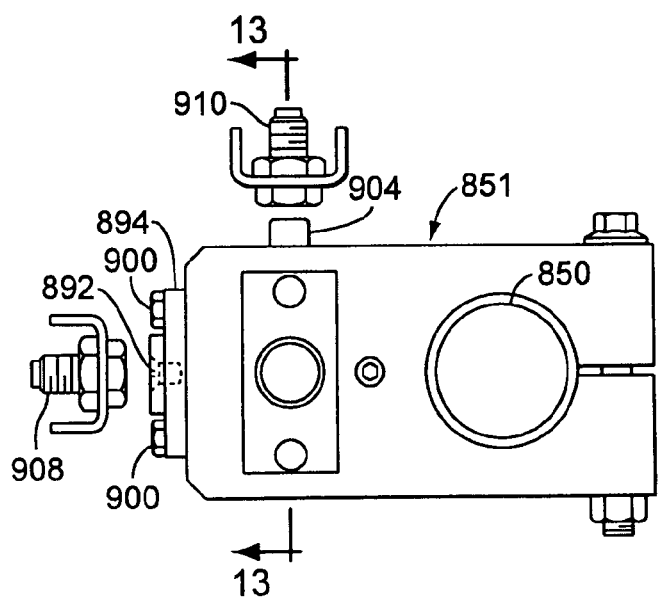
FIG. 11
FIG. 12

MOLD COVER LIFT SYSTEM FOR A PATTY-FORMING APPARATUS

This application claims the benefit of U.S. provisional application Ser. No. 60/503,354, filed Sep. 16, 2003 and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Food processors frequently need to access the mold plate to change out or replace the mold plate or to clean the apparatus. In order to accomplish this, the mold cover has to be lifted off the mold plate. The mold cover is heavy and located above the machine base. Prior systems have provided automated means to lift the mold cover such as described in U.S. Pat. No. 3,887,964.

Although heretofore known FORMAX patty-molding machines have achieved commercial success and wide industry acceptance, the present inventors have recognized that needs exist for a forming machine having an improved mold cover lifting arrangement that results in a quicker, more reliable arrangement for lifting the mold cover.

SUMMARY OF THE INVENTION

The invention provides an improved mold cover lift system for a reciprocating mold plate type patty-forming machine. To change mold plates and/or to thoroughly clean the machine, the mold cover must be lifted. The system of the invention includes two jacks that utilize jackscrews that are turned by a motor drive. The jack screws turn drive nuts that lift columns that lift the mold plate cover. According to the invention, secondary nuts are applied to the jackscrews, beneath the drive nuts. The secondary nuts limit the downward movement of the mold cover in the unlikely event that the drive nuts fail to limit such movement.

According to the preferred embodiment, a reciprocating mold plate food patty-forming machine is provided that includes a mold plate that reciprocates between a cavity fill position and a patty discharge position. The mold plate is movable beneath a mold cover. A mold cover lifting apparatus is provided as part of the machine, and comprises a primary threaded drive that is configured to support and elevate the mold cover and which elevates or lowers upon input of rotary power to raise or lower the mold cover. A motor is operatively connected to the primary threaded drive to input rotary power to the primary threaded drive. A secondary threaded element follows the primary threaded drive and is configured to support the mold cover if the primary threaded drive fails.

Preferably, the primary threaded drive comprises a first nut guided for vertical movement without rotation and a threaded rod that is threadedly engaged with said first nut. Rotation of the threaded rod vertically translates the first nut. The motor is operatively connected to the threaded rod to rotate the threaded rod about its axis. The secondary threaded element comprises a second nut also engaged with the threaded rod. The first and second nuts are mutually engagable to translate together on the threaded rod.

The lifting apparatus described above can be one of two such lifting apparatus with a common motor. The lifting apparatuses are arranged on opposite lateral sides of the mold cover.

A gear train is operatively connected between the motor and the threaded rod of each lifting apparatus. The motor is preferably a hydraulic motor powered by the machine hydraulic system.

Numerous other advantages and features of the present invention will be become readily apparent from the following detailed description of the invention and the embodiments thereof, and from the accompanying drawings.

BRIEF DESCRIPTION OF THE DRAWINGS

FIG. 11 is an enlarged, fragmentary view taken from the right side of FIG. 2;

FIG. 12 is an enlarged, fragmentary, sectional view taken generally along line 12—12 of FIG. 11, with some components and/or panels removed for clarity;

DETAILED DESCRIPTION OF THE PREFERRED EMBODIMENTS

Figure 1:
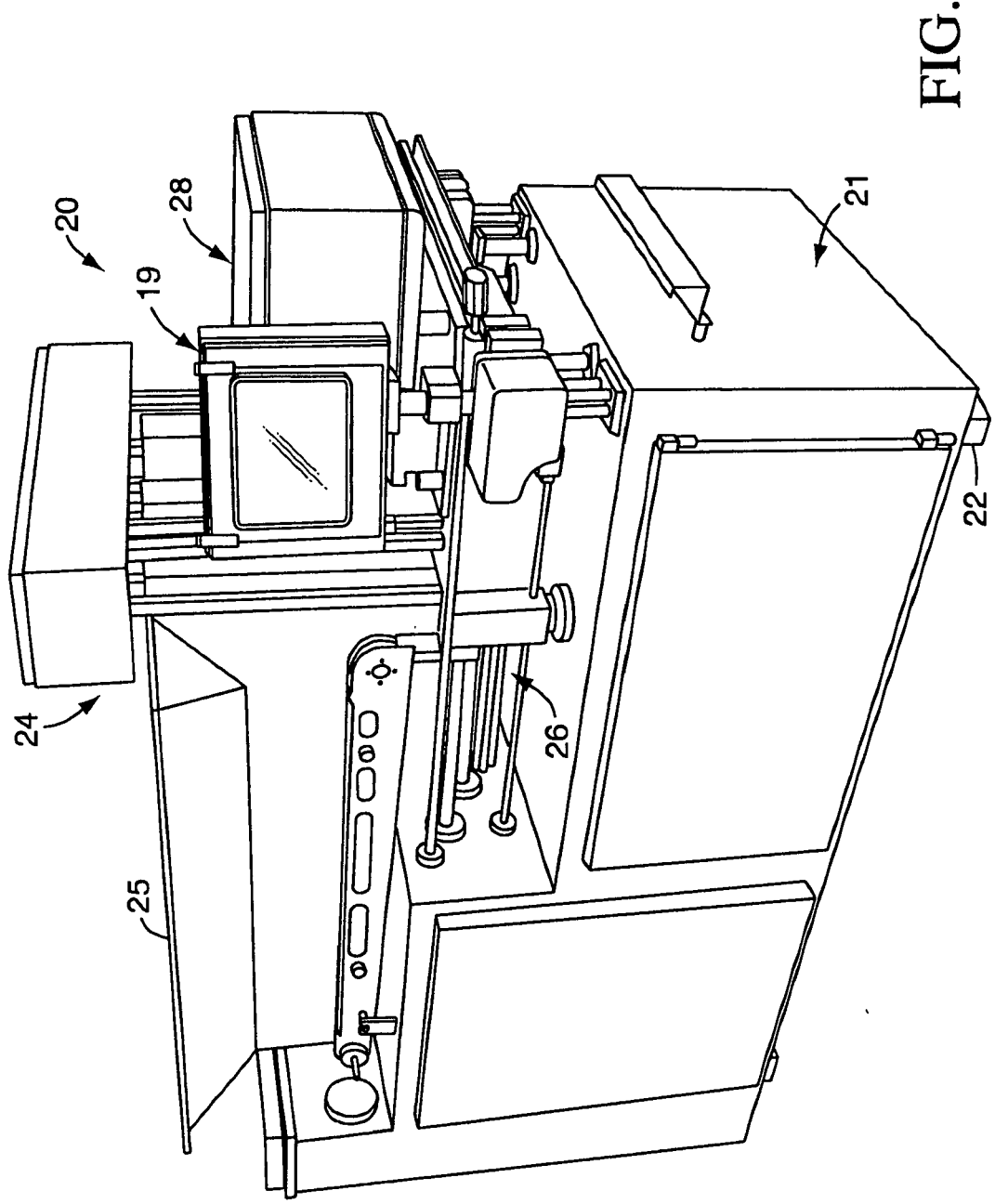
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises a preferred embodiment of the invention. The complete machine is describes in U.S. Ser. No. 10/942,627, filed on the same day as the present application, and herein incorporated by reference. This application also incorporates by reference U.S. application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contains hydraulic actuating systems, electrical actuating systems, and most of the machine controls. The machine 20 includes a supply 24 for supplying moldable food material, such as ground beef, fish, or the like, to the processing mechanisms of the machine.

A control panel 19, such as a touch screen control panel, is arranged on a forward end of the apparatus 20 and communicates with a machine controller 23.

As generally illustrated in FIGS. 2–6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 is defined by a conveyor belt 31 of a conveyor 30. The conveyor belt has a top surface 31a for moving the food material longitudinally of the hopper 25 to a hopper forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1A:
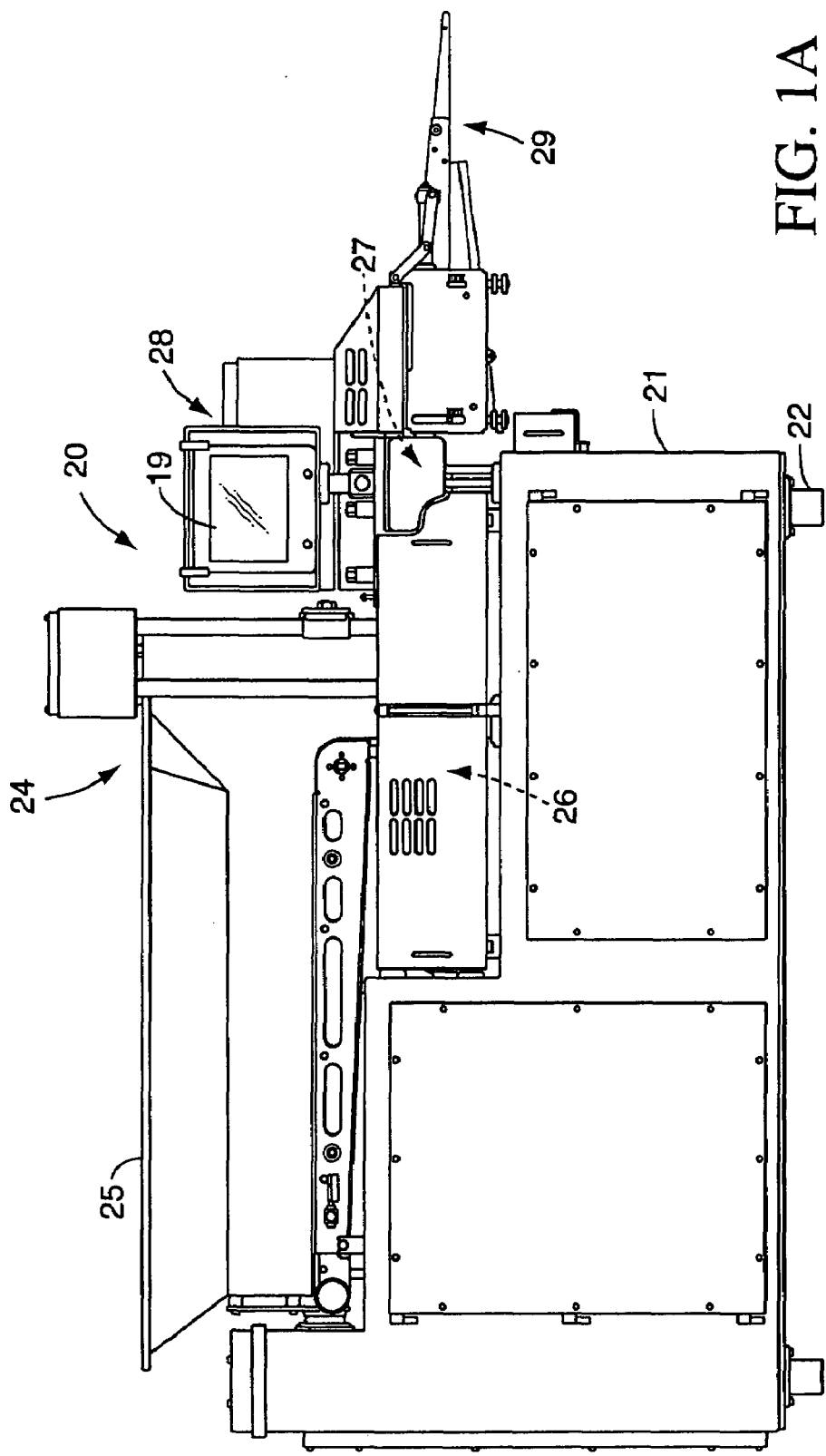
FIG. 1A is an elevational view of the patty-forming machine of FIG. 1.

The manifold 27 comprises a path for feeding the food material, still under relatively high pressure, into the molding mechanism 28. Molding mechanism 28 operates on a cyclic basis, first sliding a multi-cavity mold plate 32 into a receiving position over manifold 27 (FIG. 9A) and then away from the manifold to a discharge position (FIG. 9F) aligned with a series of knock out plungers such as knock out cups 33. When the mold plate 32 is at its discharge position, knock out cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2–6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted on top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
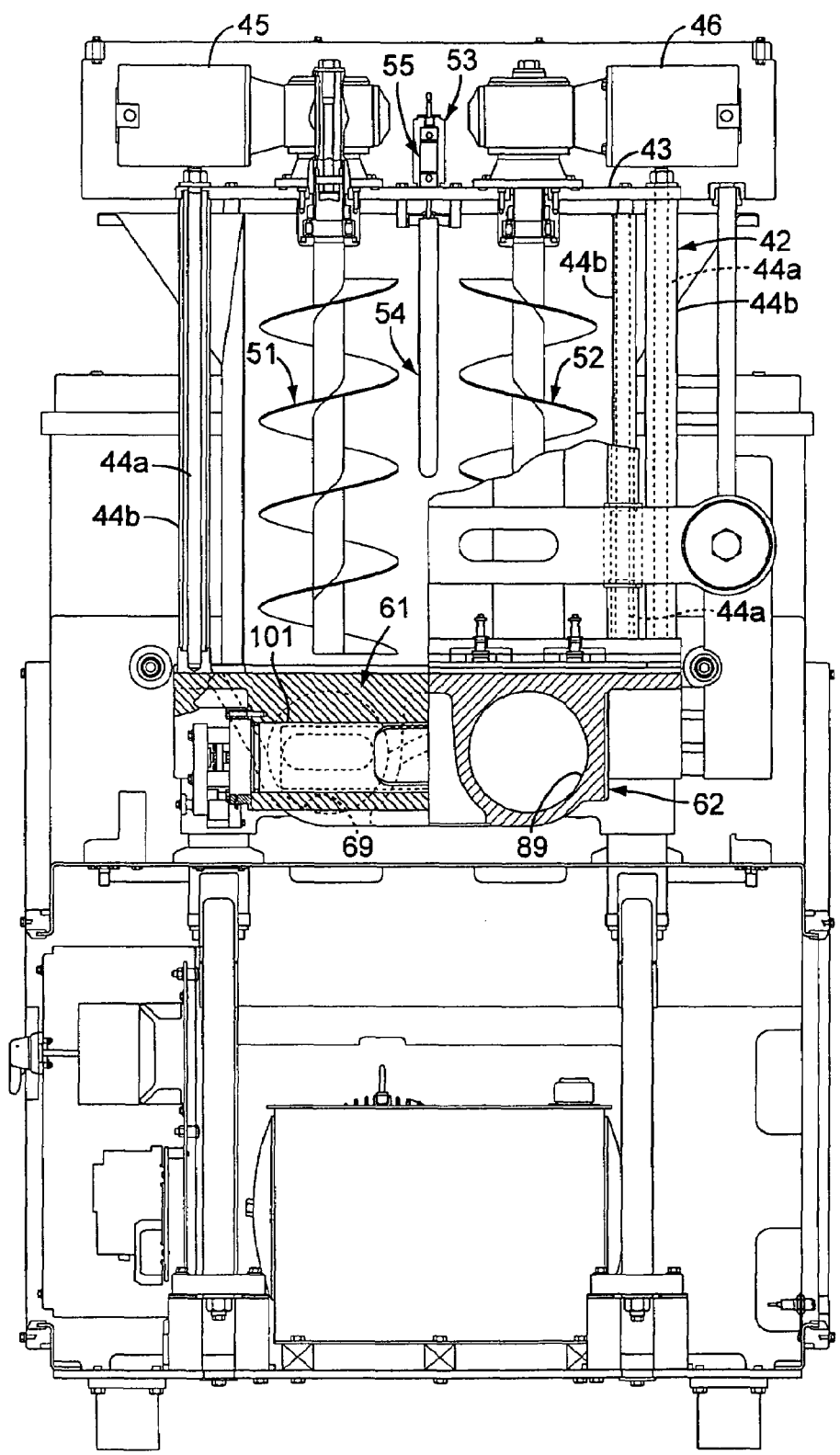
FIG. 5 is a sectional view taken generally along line 5—5 of FIG. 2, with some components and/or panels removed for clarity.

As shown in FIG. 5, the vertical pump 38 comprises two feed screw motors 45, 46 that drive feed screws 51, 52. The two electrical feed screw motors 45, 46 are mounted on the support plate 43, within the motor housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25 comprising an elongated sensing element 54. As the moldable food material is moved forwardly in the hopper 25, it may accumulate to a level in which it engages the sensing element 54. When this occurs, a signal is generated to interrupt the drive for the roller 36 of conveyor 31. In this manner the accumulation of food material at the forward end 25a of hopper 25 is maintained at an advantageous level.

Figure 2:
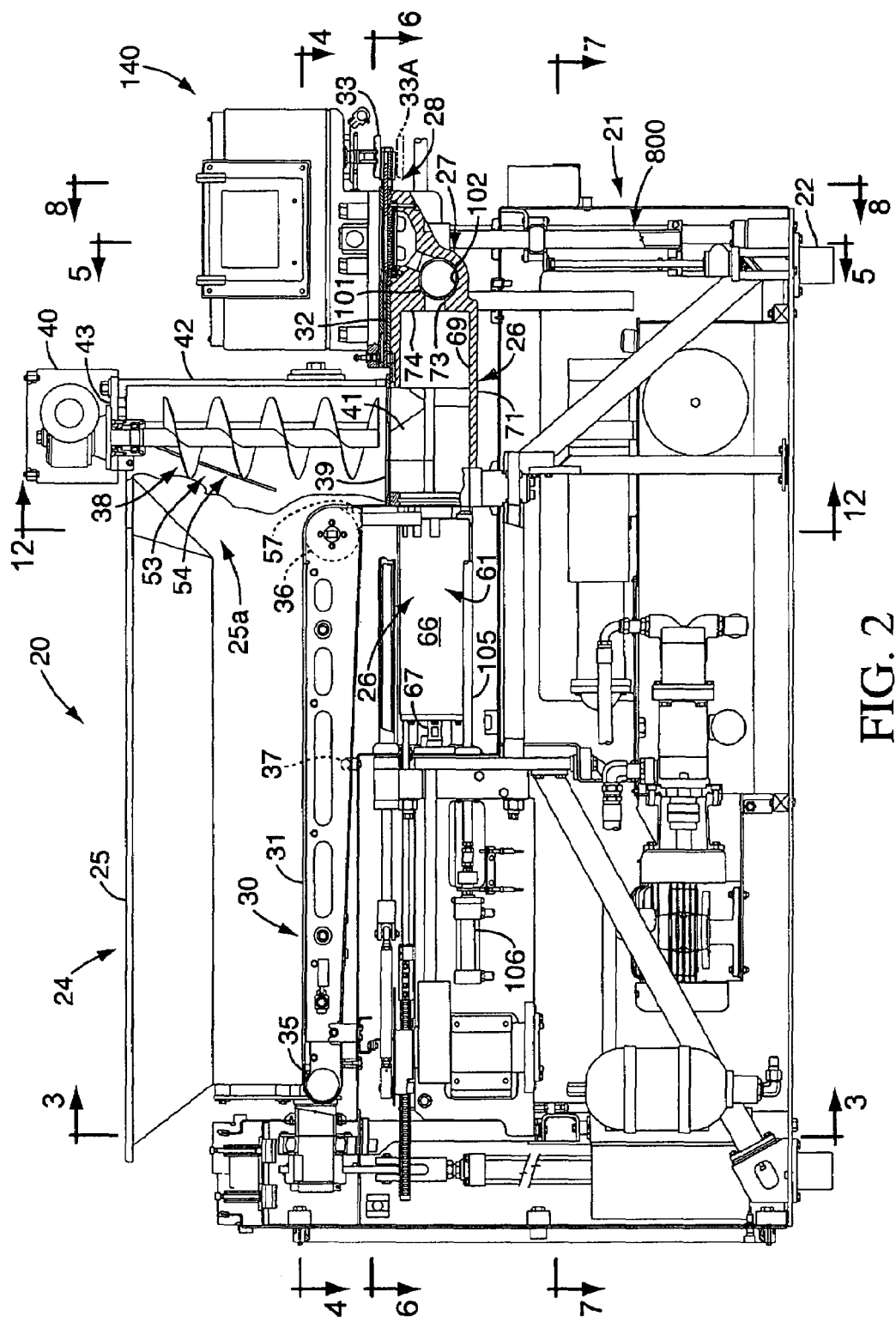
FIG. 2 is a longitudinal sectional view of the patty-forming machine of FIG. 1, with some components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 31 is stopped, as described above, until the supply at the hopper outlet is again depleted.

The wall of the outlet 39 immediately below conveyor drive rollers 36 comprises a belt wiper plate 57 that continuously engages the surface of the conveyor belt 31 to prevent leakage of the food material 38 from the hopper at this point.

Food Pump System

Figure 6:
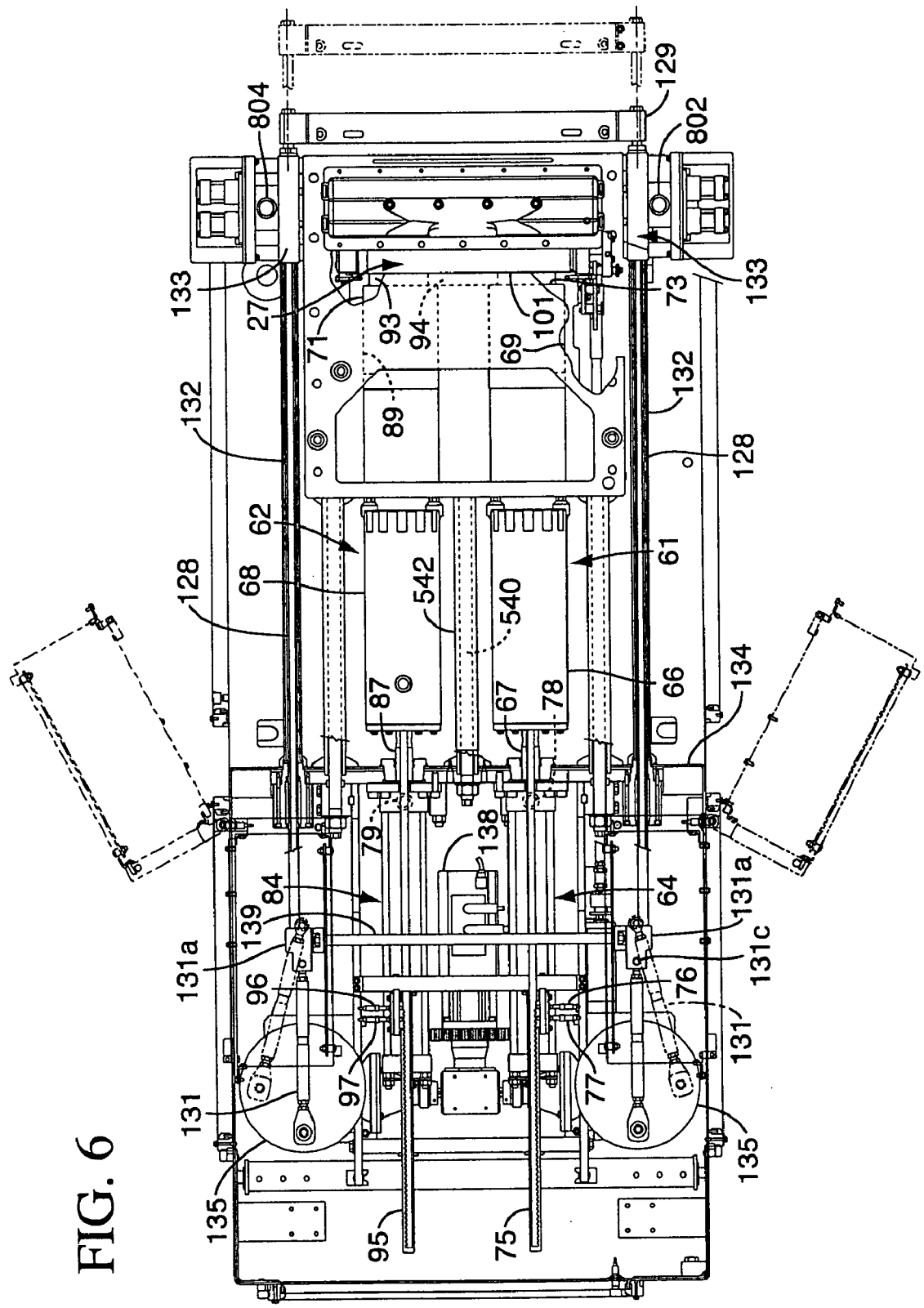
FIG. 6 is a sectional view taken generally along line 6—6 of FIG. 2, with some components and/or panels removed for clarity.
Figure 7:
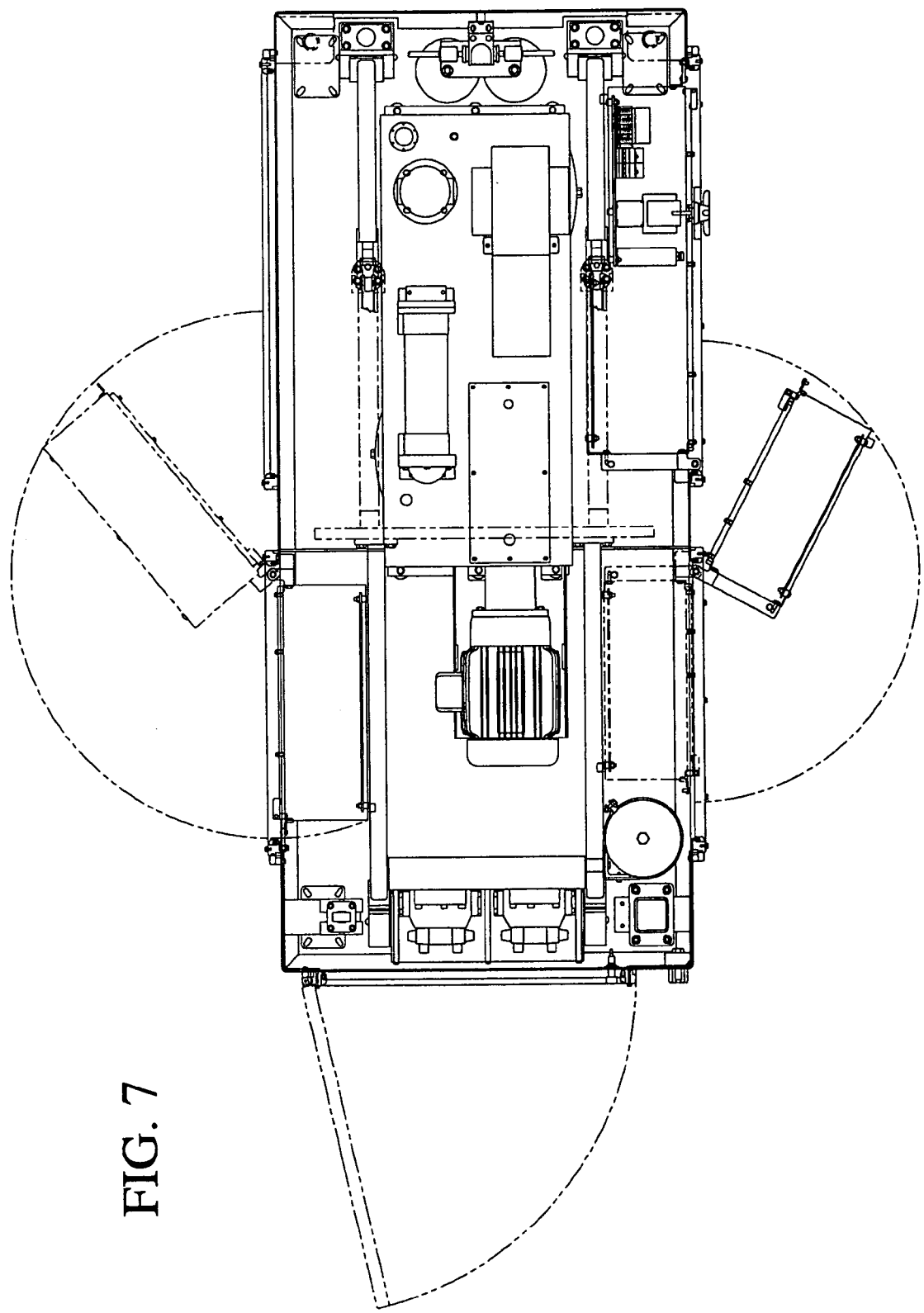
FIG. 7 is a sectional view taken generally along line 7—7 of FIG. 2, with some components and/or panels removed for clarity.

The food pump system 26 of molding machine 20 is best illustrated in FIGS. 2 and 6. Pump system 26 comprises the two reciprocating food pumps 61, 62 mounted on the machine base 21. The first food pump 61 includes a hydraulic cylinder 64. The piston in cylinder 64 (not shown) is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the pump manifold 27 as described more fully hereinafter.

Preferably the pump housing 71 and the valve manifold 27 are cast or formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68, and the cavities 69, 89 have round cross sections for ease of manufacturing and cleaning.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the chamber 69 during the molding cycle, or preferably can provide a pre-selected pressure profile over the molding cycle such as described in U.S. Pat. No. 4,356,595, incorporated herein by reference, or as utilized in currently available FORMAX machines.

When plunger 66 is near the end of its permitted range of travel, pump 62 is actuated to advance plunger 68 through pump cavity 89, compressing the food material in the second pump cavity in preparation for feeding the food material from the cavity into manifold 27.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, the changeover process described immediately above is reversed. Pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The pump feed manifold 27, shown in FIGS. 2 and 6, holds a manifold valve cylinder or tube valve 101 fit into an opening 102 in housing 71 immediately beyond the pump cavity walls 74 and 94.

According to the illustrated embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, in turn connected to the end of the piston rod 105 of a hydraulic actuator cylinder 106 (FIG. 2).

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Ser. No. 10/942,754, filed on the same day as the present invention, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
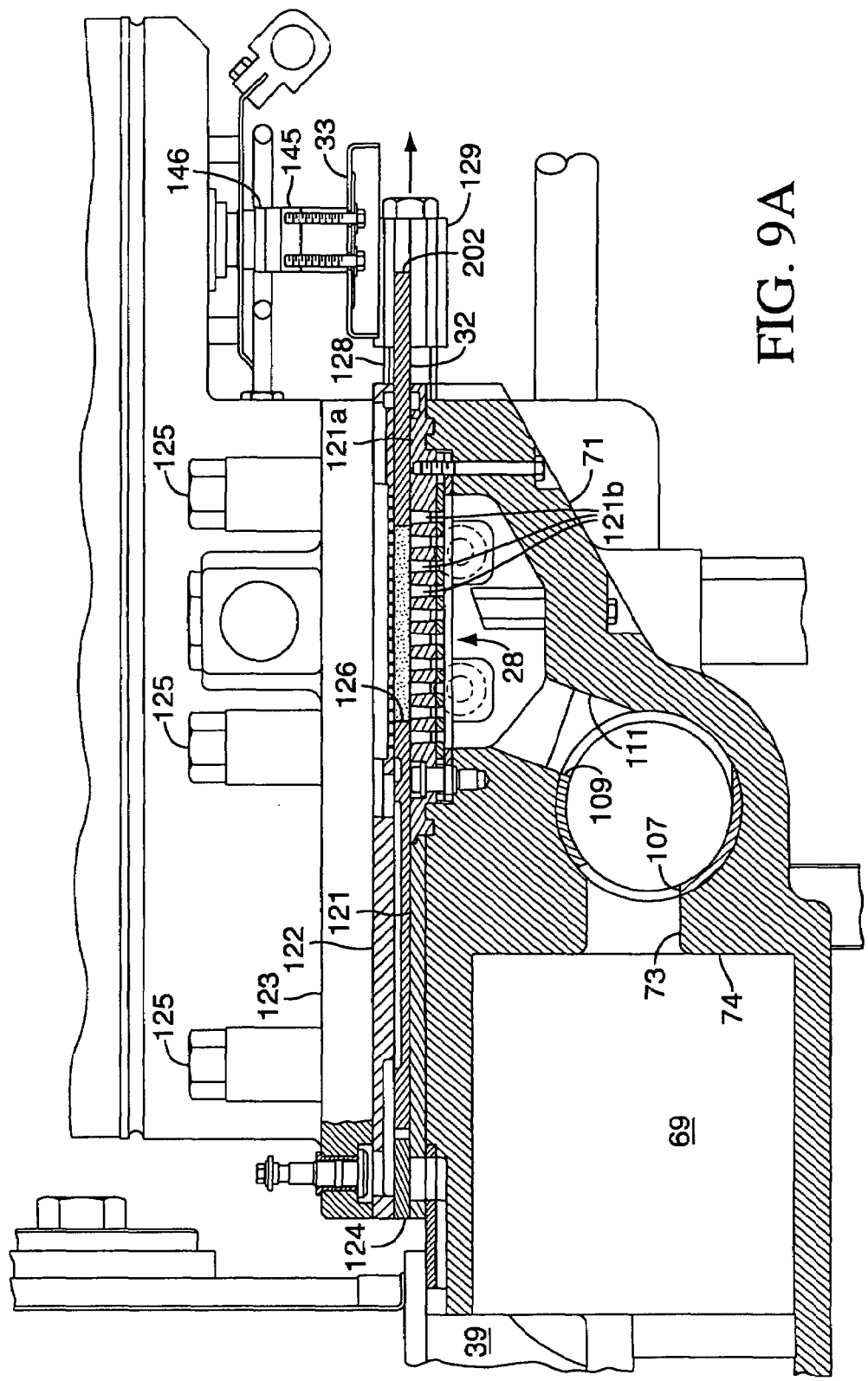
FIG. 9A is an enlarged fragmentary sectional views taken from FIG. 2, showing the machine configuration with the mold plate in a cavity fill position.

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown or a single plate bolted to or otherwise fixedly mounted upon housing 71. The fill plate 121a includes apertures or slots that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover casting 123 are held in place by six mounting bolts, or nuts tightened on studs, 125.

The cover plate 122 can be configured as a breather plate as part of a molding mechanism air-and-fines removal system, such as described in U.S. Ser. No. 10/942,755, and filed on the same day as the present application, and herein incorporated by reference.

Figure 3:
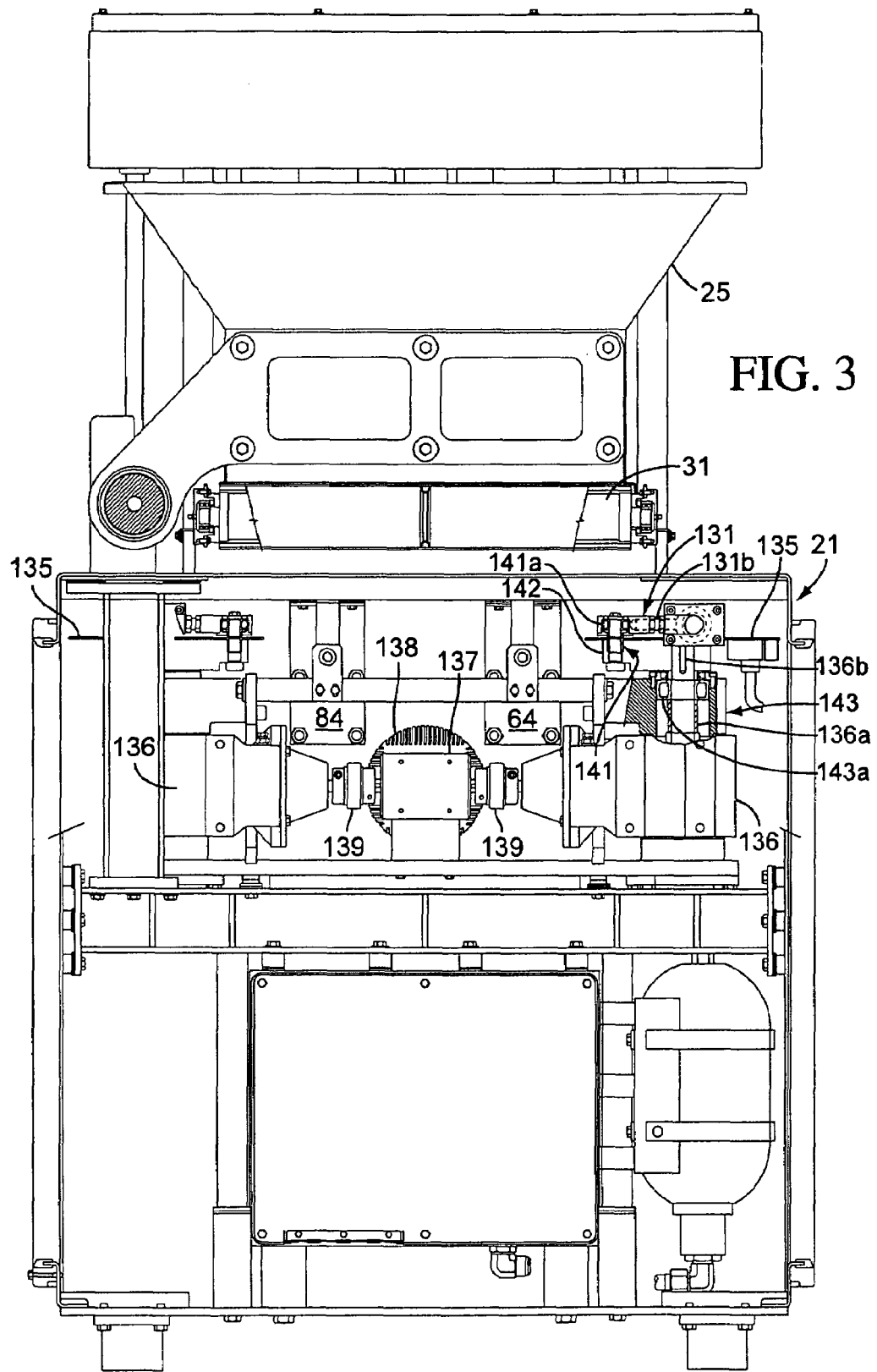
FIG. 3 is a sectional view taken generally along line 3—3 of FIG. 2, with some components and/or panels removed for clarity.
Figure 4:
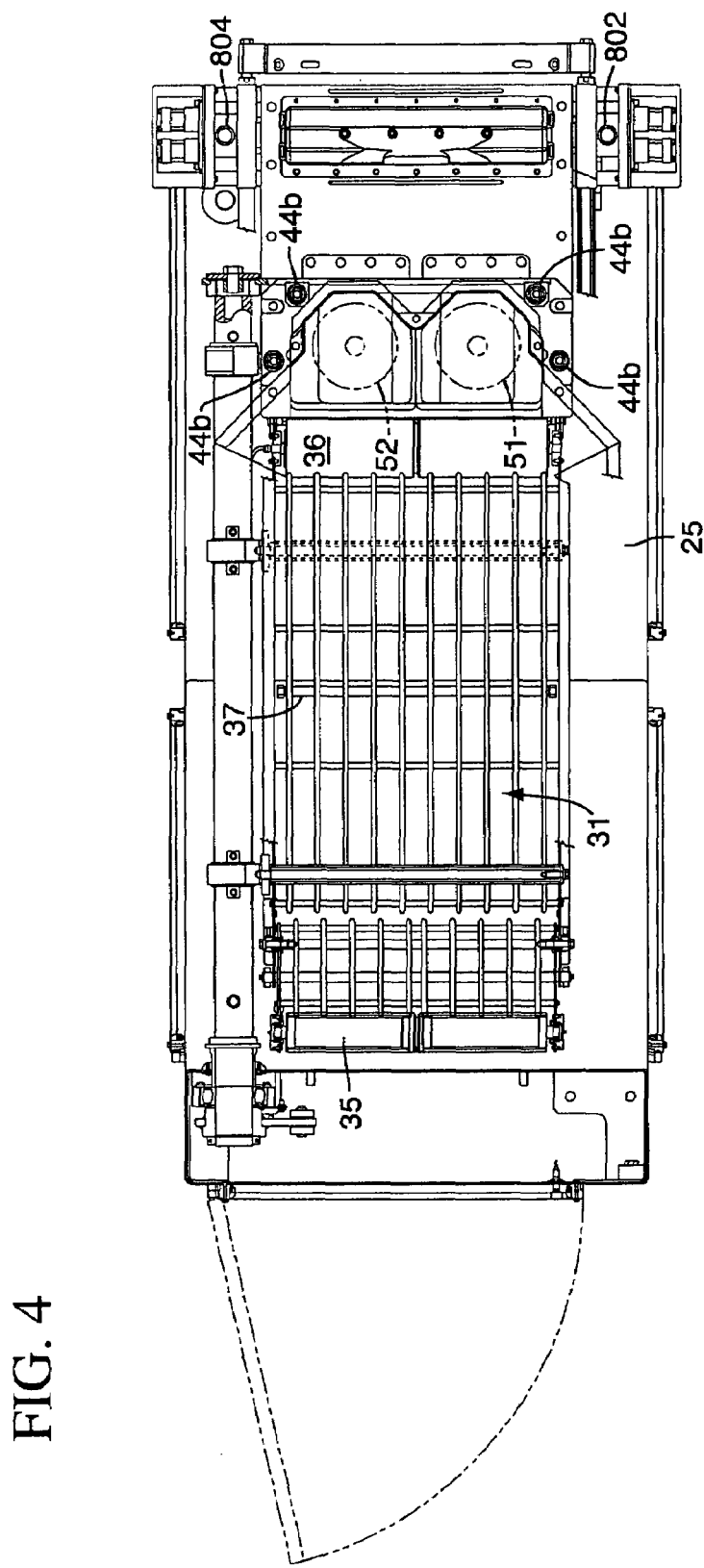
FIG. 4 is a sectional view taken generally along line 4—4 of FIG. 2, with some components and/or panels removed for clarity.

As best illustrated in FIGS. 3 and 6 mold plate 32 is connected to drive rods 128 that extend alongside housing 71 and are connected at one end to a transverse bar 129. The other end of each drive rod 128 is pivotally connected to a connecting link 131 via a coupling plate 131*a* and a pivot connection 131*c*, shown in FIG. 2. The pivot connection 131*c* can include a bearing (not visible in the figures) surrounding a pin within an apertured end of the connecting link 131. The pin includes a cap, or carries a threaded nut, on each opposite end to secure the crank arm to the coupling plate 131*a*.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141*a* that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131*b* to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6–7.5 HP totally enclosed fan cooled servo motor. The servo motor is provided with two modules: a power amplifier that drives the servo motor, and a servo controller that communicates precise position information to the machine controller.

The controller 23 and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143*a* therein to journal an output shaft 136*a* of the gear box 136. The output shaft 136*a* is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136*b* on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

During a molding operation, the molding mechanism 28 is assembled as shown in FIGS. 2 and 9A, with cover plate 122 tightly clamped onto spacers 124.

The knockout cups 33 are driven by a knockout drive mechanism as described in U.S. Ser. No.10/943,809, filed on the same day as the present application, and herein incorporated by reference.

Figure 9B:
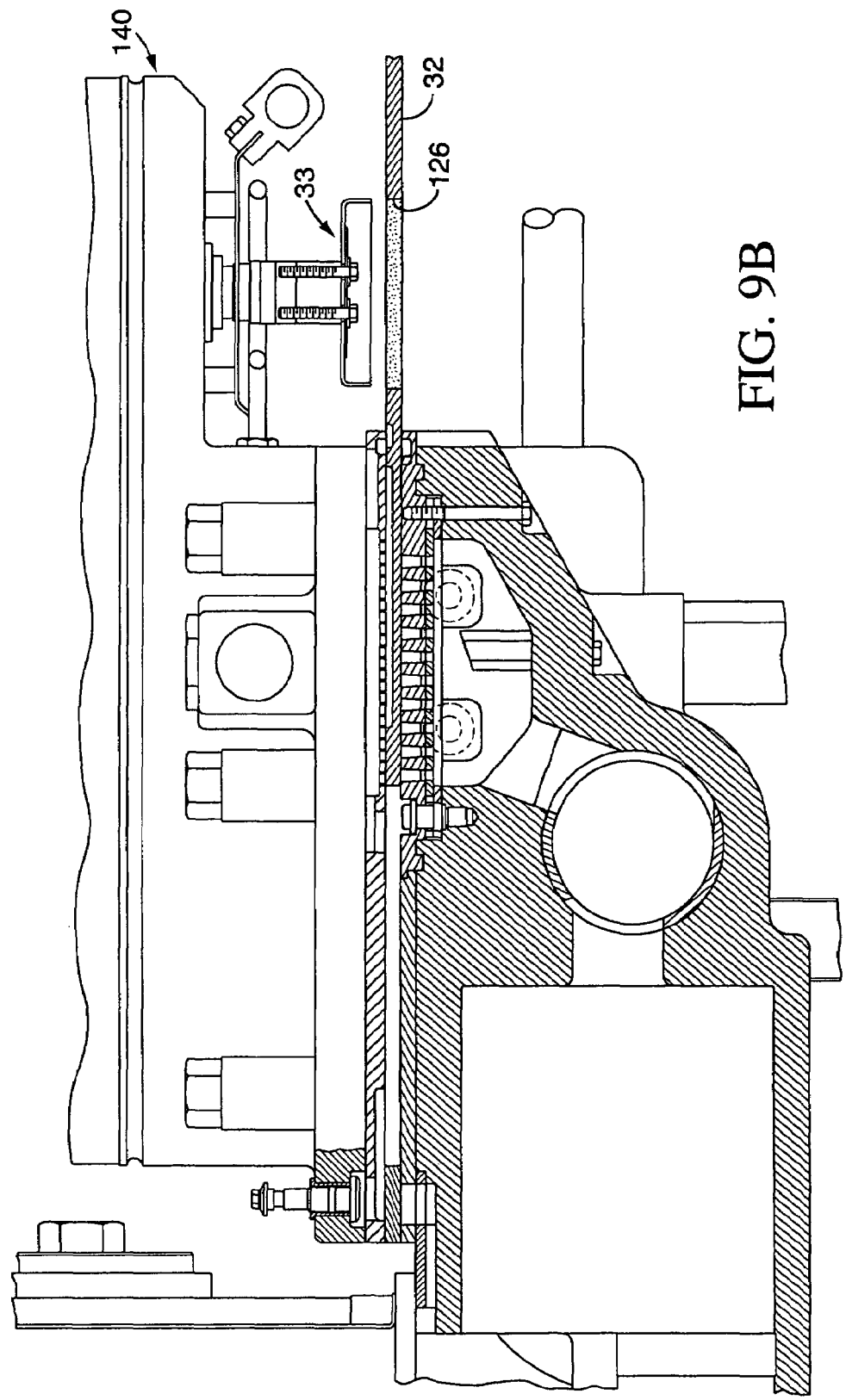
FIG. 9B is an enlarged fragmentary sectional views taken from FIG. 2, showing the machine configuration with the mold plate in a patty discharge position.

In each cycle of operation, knockout cups 33 are first withdrawn to the elevated position as shown in FIG. 9B. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIG. 9B, with knockout cups 33 clear of mold plate 32. When mold plate 32 reaches its extended discharge position as shown in FIG. 9B the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, and herein incorporated by reference. In fact, machine 20 may be used with a wide variety of secondary equipment, including steak folders, bird rollers, and other such equipment.

Mold Cover Lift System

During mold plate change or to clean the apparatus, it is necessary to lift the mold housing or mold cover 123 from above the mold plate 32. The bolts 125 are removed as a first step for lifting of the housing 123.

Figure 10:
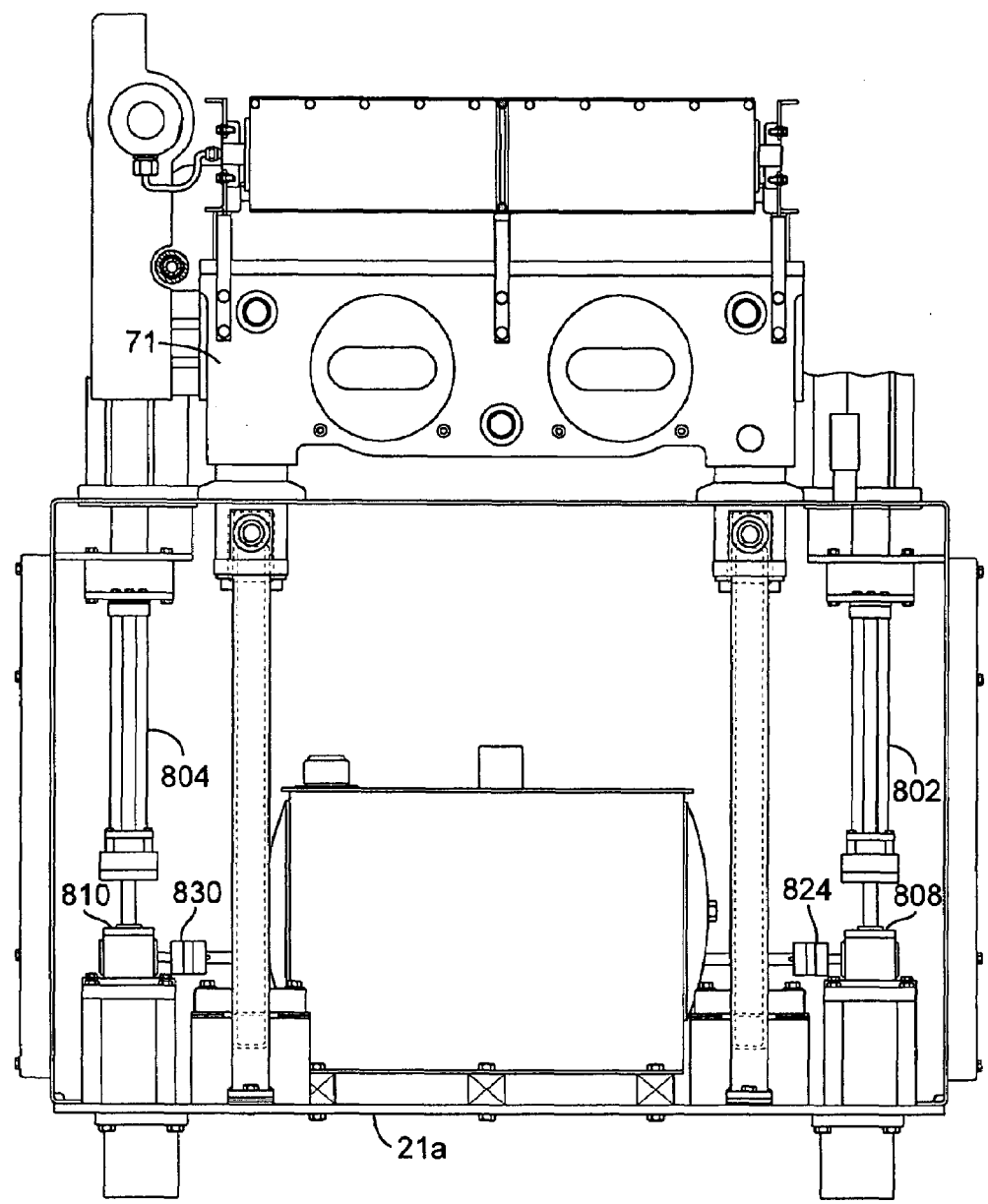
FIG. 10 is a fragmentary sectional view taken generally along line 10—10 of FIG. 2, with portions of the apparatus removed for clarity of depiction, with some components and/or panels removed for clarity.

A mold housing lift mechanism 800 is mounted inside the machine base 21 and extends upward to the housing 123. The lift mechanism includes two jacks 802, 804 shown in FIGS. 8 and 10. The jacks are operatively connected to right angle drives 808, 810, which are operatively connected to a T type right angle drive 814, via drive shafts 818, 820 and respective couplings 823, 824, 826, 828, 830. The right angle drive 814 is driven into rotation by a hydraulic motor 836.

The jack 802 is described below with the understanding that the jack 804 is identically configured and functions identically, in tandem, as the jack 802.

Figure 8:
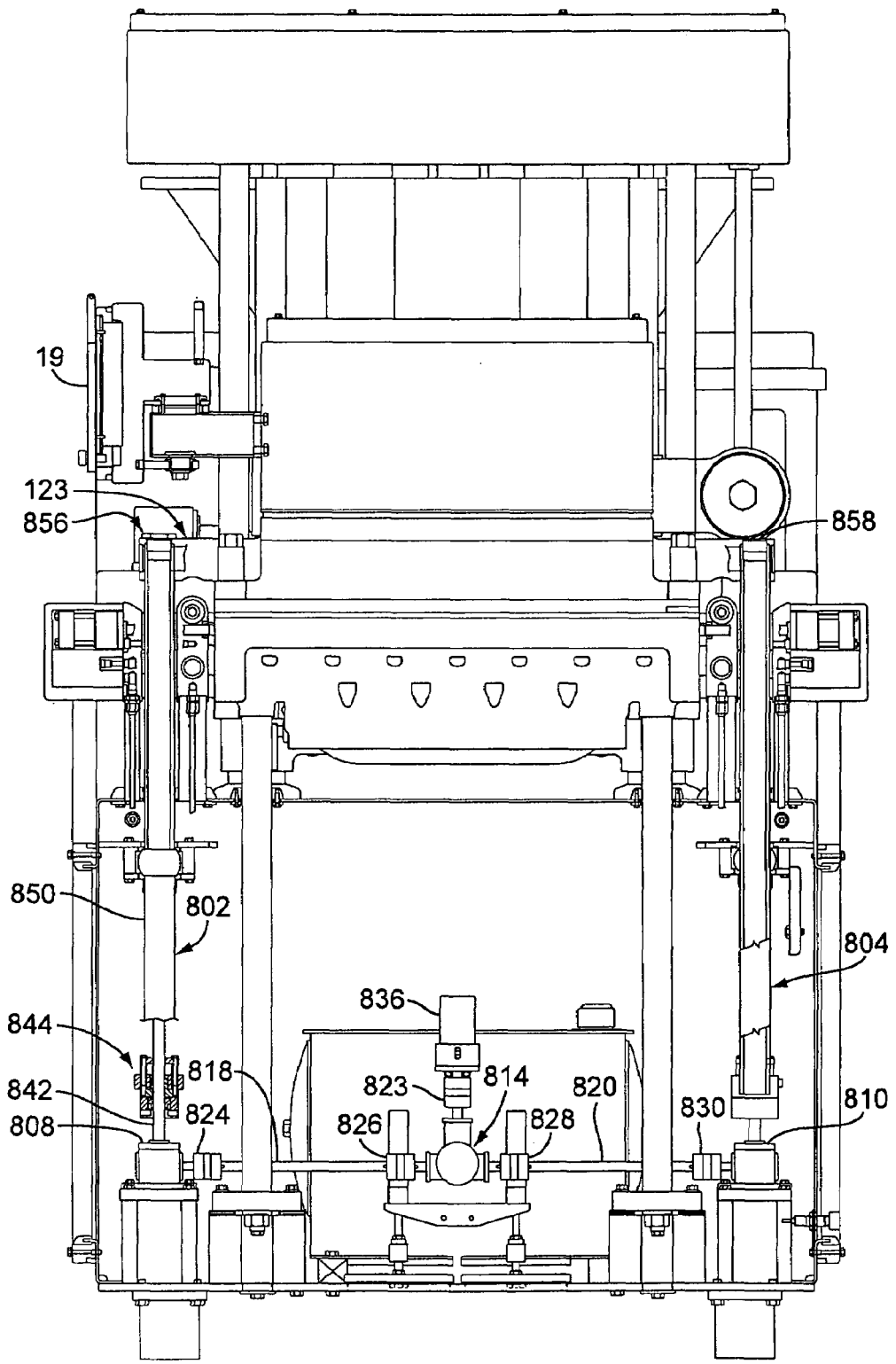
FIG. 8 is a sectional view taken generally along line 8—8 of FIG. 2, with some components and/or panels removed for clarity.

As shown in FIGS. 8, 11 and 12 the drive 808 turns a threaded rod or jackscrew 842 that drives a nut drive assembly 844 vertically. The jack screw 872 is journaled for rotation at a top end by a guide 845. The jack screw 842 and guide 845 can include a bearing therebetween for smooth journaled rotation of the jackscrew. The drive assembly 844 is operatively connected to a lift column 850 via a bracket 851 which is vertically driven with the drive nut assembly. The columns 850 of the jacks 802, 804, are fixed to the housing 123 by bolts 856, 858. The columns 850 are hollow and can also serve as wire and tube conduits.

As shown in FIGS. 11–14, the bracket 851 is clamped onto a bottom of column 850. The bracket 851 rests on a drive nut 870 that is driven by the drive rod 842. A limit plate 862 is fastened to the drive nut 870 by spacers 867 and fasteners 866. A collar 874 is fastened to the bottom of the drive nut 870 with fasteners 875.

The drive nut 870 has inside threads engaged to the outside threads of the drive rod 842. A secondary nut 882 is threaded onto the jackscrews 842 beneath the drive nut 870.

Proximity target, magnetic plate 892 is fastened to a mounting plate 894 which is fastened to the bracket 851 by fasteners 900. A proximity sensor 908 is mounted within the machine base 21 along the vertical path of the magnetic plate 892 and set at a maximum acceptable. The magnetic plate 892 sets an acceptable vertical range for a mold cover operating elevation. If the mold cover is elevated beyond this range, the sensor 908 will be below the magnetic plate 892 and will so signal the machine controller which will prevent operation of the machine.

A further proximity target 904 is fastened to a lateral side of the bracket 851. Proximity sensor 910 is mounted at an elevated position within the machine base along the vertical path of the target 904 and signals a pre-determined raised maximum height of the mold cover casting for a mold plate change out procedure. The proximity sensor 910 signals the machine controller to stop the motor 836 at that point.

Figure 14:
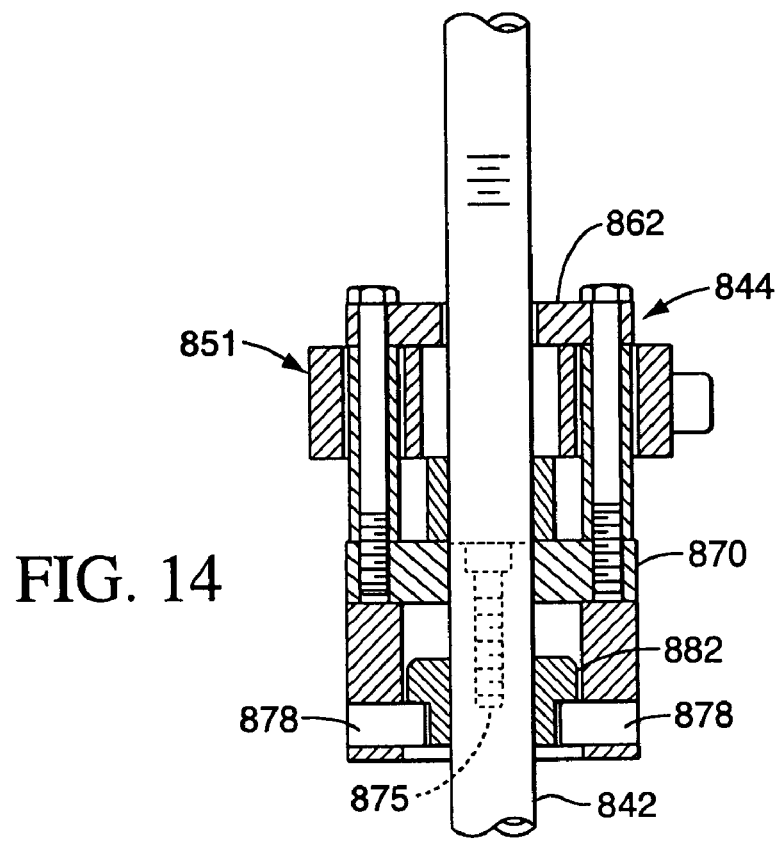
FIG. 14 is an enlarged, fragmentary, sectional view taken generally of along line 13—13 of FIG. 12 showing the drive nut assembly in a lowered position not supporting the mold cover.

The collar 874 has internal protruding pins 878, surrounding the jackscrew 842 and a secondary nut 882. The secondary nut includes notches 886 for receiving the pins 878. During normal lifting operation, the pins will be engaged to, or will engage, the secondary nut 882 as shown in FIG. 14. The secondary nut 882 ceases to rotate freely with the jackscrew 842 and thereafter travels with the assembly 844 up and down on the jackscrew 842. The secondary nut 882 provides backup support for the drive nut 870 in the unlikely event that the drive nut fails to support the bracket 851.

Figure 13:
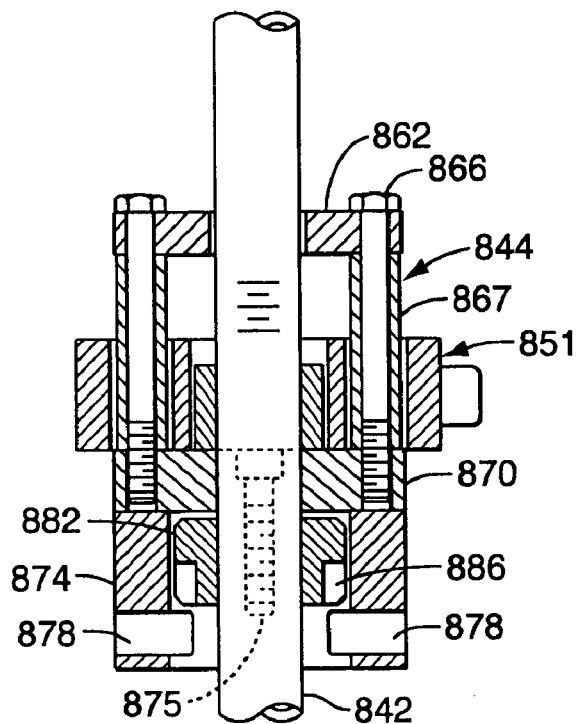
FIG. 13 is an enlarged, fragmentary, sectional view taken generally of along line 13—13 of FIG. 12 showing the drive nut assembly lifting the mold cover, before the secondary nut is engaged to the assembly.

As shown in FIG. 13, before engagement with the pins of the drive nut assembly 844, the secondary nut 882 is free to rotate with the jackscrew 842 between the nut 870 and the pins 878. Once the pins 878 are relatively elevated with respect to the nut 882 to engage the notches 886 the secondary nut moves vertically with the assembly 844. If the drive nut 870 fails during lifting, the secondary nut 882 is in a position to support the drive nut assembly and bracket 851, but will not function to lift the nut assembly 844. If the jackscrew is turned, the secondary nut 882 will rise to the point until it disengages from the pins 878 and then turn substantially freely with the rotating jackscrew 842.

FIG. 14 illustrates the assembly with the mold cover lowered and the nut 870 lowered a further amount with the plate 862 contacting, or adjacent to, the bracket 851. Thus, the nut assembly 844 can completely disengage from the bracket 851.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a reciprocating mold plate food patty-forming machine, wherein a mold plate reciprocates between a cavity fill position and a patty discharge position, the mold plate movable beneath a mold cover, a mold cover lifting apparatus, comprising:

a primary threaded element that is configured to support and elevate said mold cover and which elevates or lowers upon input of rotary power to raise or lower said mold cover;

a motor operatively connected to said primary threaded drive to input rotary power to said primary threaded drive; and a secondary threaded element that follows said primary threaded drive and is configured to support said mold cover if said primary threaded drive fails.

2. The lifting apparatus according to claim 1, wherein said primary threaded element comprises a first nut guided for vertical movement without rotation and a threaded rod that is threadedly engaged with said first nut, rotation of said threaded rod vertically translating said first nut; said motor operatively connected to said threaded rod to rotate said threaded rod about its axis.

3. The lifting apparatus according to claim 2, wherein said secondary threaded element comprises a second nut also engaged with said threaded rod.

4. The lifting apparatus according to claim 3, wherein said first and second nuts are mutually engagable to translate on said threaded rod together.

5. The lifting apparatus according to claim 3, comprising a gear train operatively connected between said motor and said threaded rod.

* * * * *